United States Patent
Block et al.

(10) Patent No.: US 9,548,666 B2
(45) Date of Patent: Jan. 17, 2017

(54) METHOD AND APPARATUS FOR OFFLINE SWITCH MODE POWER SUPPLY WITH DITHERED SWITCHING FREQUENCY

(71) Applicant: Landis+Gyr, Inc., Lafayette, IN (US)

(72) Inventors: Thomas G. Block, Carmel, IN (US); Matt E. Kraus, Jamestown, IN (US)

(73) Assignee: Landis+Gyr Inc., Lafayette, IN (US)

(*) Notice: Subject to any disclaimer, the term of this patent is extended or adjusted under 35 U.S.C. 154(b) by 232 days.

(21) Appl. No.: 14/548,177

(22) Filed: Nov. 19, 2014

(65) Prior Publication Data
US 2015/0138838 A1    May 21, 2015

Related U.S. Application Data
(60) Provisional application No. 61/906,281, filed on Nov. 19, 2013.

(51) Int. Cl.
*H02M 3/335* (2006.01)
*H02M 1/44* (2007.01)

(52) U.S. Cl.
CPC ........... *H02M 3/33523* (2013.01); *H02M 1/44* (2013.01)

(58) Field of Classification Search
CPC ........ H02M 3/325; H02M 3/335; H02M 3/28; H02M 3/33569; H02M 3/33507
USPC ............................... 363/16, 20, 21.01–21.18
See application file for complete search history.

(56) References Cited

U.S. PATENT DOCUMENTS

| | | |
|---|---|---|
| 2010/0036624 A1 | 2/2010 | Martin |
| 2010/0174490 A1 | 7/2010 | McAhren |
| 2010/0275052 A1* | 10/2010 | Ku .............................. G06F 1/08 713/501 |
| 2010/0283452 A1 | 11/2010 | Voisine |

OTHER PUBLICATIONS

Basso, Christophe, AND8134/D: Designing Converters with NCP101X Family, http://onsemi.com, Semiconductor Components Industries LLC, Oct. 2003, Rev. 0.
Cathell, Frank, AND8296/D: Increasing Low Power Converter Efficiency with Resonant Snubbers, http://onsemi.com, Semiconductor Components Industries LLC, May 2008, Rev. 1.

* cited by examiner

Primary Examiner — Adolf Berhane
Assistant Examiner — Afework Demisse
(74) Attorney, Agent, or Firm — Maginot, Moore & Beck LLP

(57) ABSTRACT

A circuit for use in a switched mode power supply comprising includes an integrated circuit, a transformer, a capacitor, a low voltage circuit and a current limiting resistor. The IC jitters the switching frequency of the switch based on a bias voltage of the integrated circuit. The IC also includes a current source configured to supply current for operation of the switching regulator when insufficient current is available from the bias input pin. The transformer includes primary, secondary and auxiliary windings. The primary winding receives a rectified line voltage and is coupled to the switch. The capacitor is coupled between the bias input pin and ground. The low voltage circuit is coupled to the auxiliary winding, and provides current to the bias input pin. The current limiting resistor limits current produced by the low voltage circuit to less than that required for operation of the IC.

19 Claims, 4 Drawing Sheets

METHOD AND APPARATUS FOR OFFLINE SWITCH MODE POWER SUPPLY WITH DITHERED SWITCHING FREQUENCY

This application claims the benefit of U.S. Provisional Patent Application Ser. No. 61/906,281, filed Nov. 19, 2013, which is incorporated herein by reference.

BACKGROUND

A common type of switched mode power supply (SMPS), for example, a flyback SMPS, includes a transformer, a semiconductor switch, and a control circuit. The transformer provides a voltage conversion from the available input voltage to the desired output voltage. The semiconductor switch, which may suitably be a power MOSFET, switches at a high frequency to create a high frequency signal that can efficiently propagate through a transformer with limited loss. The duty cycle and/or switching frequency is controlled by the control circuit to accommodate different loading requirements on the output.

Commercially available integrated circuits exist that may include the semiconductor switch and the control circuit in a single package, along with other features of an SMPS. One set of packages include the switch mode power supply ICs from ON Semiconductor, such as the NCP101x family, the NCP105x family. These devices include a switch input to which the primary winding of the transformer is connected, a switch, a bias input for providing bias power, and a controllable current source coupled to provide current to the bias input to allow configurations for the IC to be powered off of the line current. In other versions of similar devices, a switched mode power supply IC can include the control circuit, drive circuit and current source, but employs an external switch.

One design consideration in switched mode power supplies is the electromagnetic (EM) emissions created by the high frequency switching signal. One method of meeting conducted emission requirements involves jittering or varying the switching frequency. In general, jittering the switching frequency operates to spread the EM energy over a range of different frequencies, such that the power is not concentrated in a single frequency or a single set of harmonics.

However, in some commercially available SMPS circuits, such as those discussed above, the varying of the switching frequency is only available when the circuit is powered using AC line voltage. The problem with powering the IC from the line voltage is that when the line voltage is high, such as in many metering applications, a large quantity of power is dissipated in the SMPS circuit just to make it run. The dissipated power significantly limits the amount of power it can provide to the load without exceeding its recommended operating temperature.

To avoid the temperature limitations, methods other than varying or jittering the switching frequency can be used. Many such solutions involve powering the bias input (and the switch IC) using an external source of power, such as one based on an auxiliary (lower voltage) winding of the transformer. In such a case, instead of jittering the offline SMPS switching frequency, solving the EM problem is carried out using a common mode filter across the line and neutral inputs of the power supply to reduce the average conducted emissions. The auxiliary winding provides the current needed to power the SMPS, resulting in very low power dissipation.

A second way also involves using a low voltage auxiliary winding coupled to the bias input. However, in this way, the EM emissions are reduced by using a dedicated timing circuit inside the IC to jitter the switching frequency instead of relying on the sawtooth waveform on the VCC pin. The inclusion of a dedicated timing circuit increases cost.

There is a need, therefore, for an efficient way of spreading the EM emission energy over a range of frequencies that has reduced power consumption and does not rely on special additional timing circuits within an integrated circuit.

SUMMARY

At least some embodiments of the present invention address the above-stated needs, as well as others, by employing a mix of a controlled current source powered via the line voltage, and a second current source powered by an auxiliary winding on the power supply transformer. Some embodiments allow, for example, certain offline switch mode power supply ICs to provide jittering of the switching frequency using the AC line voltage, while dissipating 75% less power than the prior art configuration. However, the invention is not limited to such implementations. In general, an exemplary embodiment of the invention uses an auxiliary winding to provide, preferably, 20% to 90% (or more) of the current needed to power the device. With this invention, the temperature of the integrated circuit stays below its maximum recommended temperature for all specified line voltages and temperatures for the electric meter while providing the benefit of reduced conducted emissions.

A first embodiment is a circuit for use in a switched mode power supply that includes an integrated circuit, a transformer, a capacitor, a low voltage circuit, and a current limiting resistor. The integrated circuit includes a switching signal generator and is used in connection with a switch, which may or may not be employed within the integrated circuit, and is configured to jitter the frequency of the switch based on a voltage available at a bias voltage pin of the integrated circuit. The integrated circuit further includes a current source coupled between a first terminal of the switch and a bias input pin, the current source configured to supply current for operation of the switching regulator when insufficient current is received through the bias input pin. The transformer includes a primary winding, a secondary winding and an auxiliary winding. The primary winding is operably coupled to receive a rectified line voltage, and is further operably coupled to the first terminal of the switch. The capacitor is coupled between the bias input pin and ground. The low voltage circuit is operably coupled to the auxiliary winding, and is configured to provide voltage to the bias input pin. The current limiting resistor is coupled between the low voltage circuit and the bias input pin, and is configured to limit current produced by the low voltage circuit to less than that required for operation of the integrated circuit.

The above-described features and advantages as well as others, will become more readily apparent to those of ordinary skill in the art by reference to the following detailed description and accompanying drawings.

DETAILED DESCRIPTION

Figure 1:
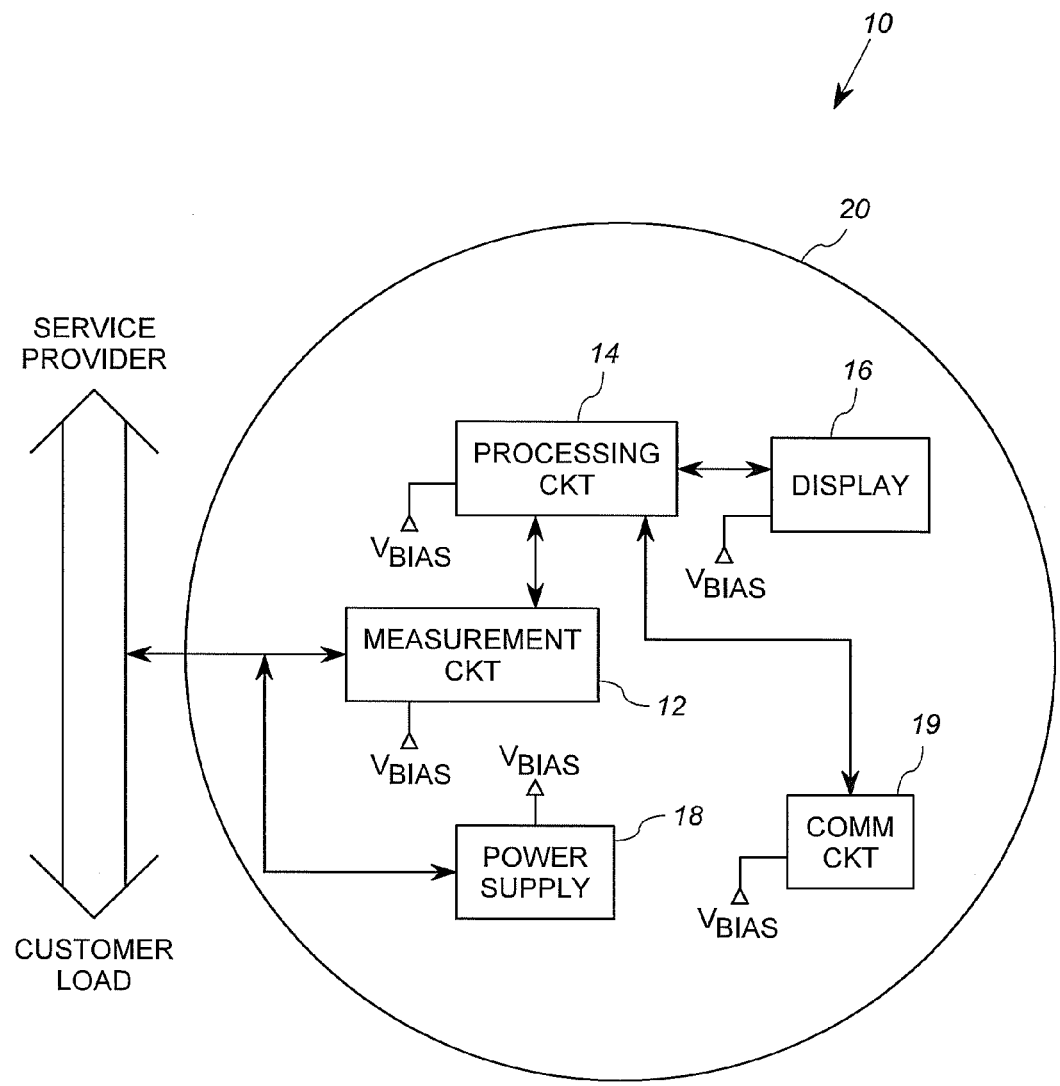
FIG. 1 shows a schematic block diagram of exemplary electricity meter that incorporates a switched mode power supply arrangement according to at least one embodiment of the invention.

FIG. 1 shows an exemplary electricity meter 10 that incorporates an arrangement for detection according to the invention. The electricity meter 10 includes measurement circuitry 12, a processing circuit 14, a display 16, a power supply 18 and optical communication circuitry 19, all disposed on or supported by or within a meter housing 20.

The measurement circuit 12 includes voltage and/or current sensors, analog to digital conversion circuitry, and other circuitry configured to generate digital measurement and/or energy signals from power lines, not shown. Such circuits for electronic meters are well known in the art. The processing circuit 14 is a circuit that performs control functions with the meter 10, and in many cases performs further processing on the digital measurement signals generated by the measurement circuit 12. For example, the processing circuit 14 may convert raw digital measurement information into a format that is displayable, or convert energy information to derivative types of energy consumption information, such as those related to time-of-use metering and/or demand metering which are known in the art.

In another embodiment, the meter 10 includes a remote communication circuit, as is known in the art, and the processing circuit 14 would communicate metering data to a remote location via such a communication circuit. It will be appreciated that the exact physical configuration of the measurement circuit 12 and the processing circuit 14 is not important to the implementation of the invention, and this embodiment of the invention may be used in a wide variety of meters that include digital processing circuitry and/or otherwise requires bias power from a power supply. Suitable embodiments of the measurement circuit 12 and such a processing circuit are described, for example, in U.S. patent application Ser. No. 12/777,244 filed May 10, 2010, Ser. No. 12/537,885, filed Aug. 7, 2009, and Ser. No. 12/652,007, filed Jan. 4, 2010, all of which are incorporated herein by reference.

The display 16 in this embodiment is an LCD display 16 that provides visible display of information as controlled by the processing circuit 14. For example the, processing circuit 14 may cause the display 16 to display energy consumption information, error codes and other information. Such display devices are known in the art and may take many forms.

The power supply 18 is a switched mode power supply that includes switching frequency dithering in accordance with an embodiment of the invention. The power supply is operably coupled to at least one power line to obtain a power line signal therefrom. The power line signal has the mains AC voltage and an alternating current frequency of 50 Hz or 60 Hz. The power supply generates bias voltages, shown collectively at $V_{BIAS}$, that are used to power the processing circuit 14, at least portions of the measurement circuit 12, the display 16 and the optical communication circuitry 19. The bias voltages can include a regulated voltage, for example, 5 volts, and another bias voltage of about 12 volts DC.

The meter housing 20 is a support structure that includes a protective cover over the electronic elements 12, 14, 16 and 18 supported by the structure 20. The meter housing 20 includes a cover that is at least partially transparent (or contains a transparent window) to allow reading of the display 16. The meter housing 20 has a conventional design that provides protection to the electronic elements 12, 14, 16 and 18 from the environment, and from tampering.

Figure 2:
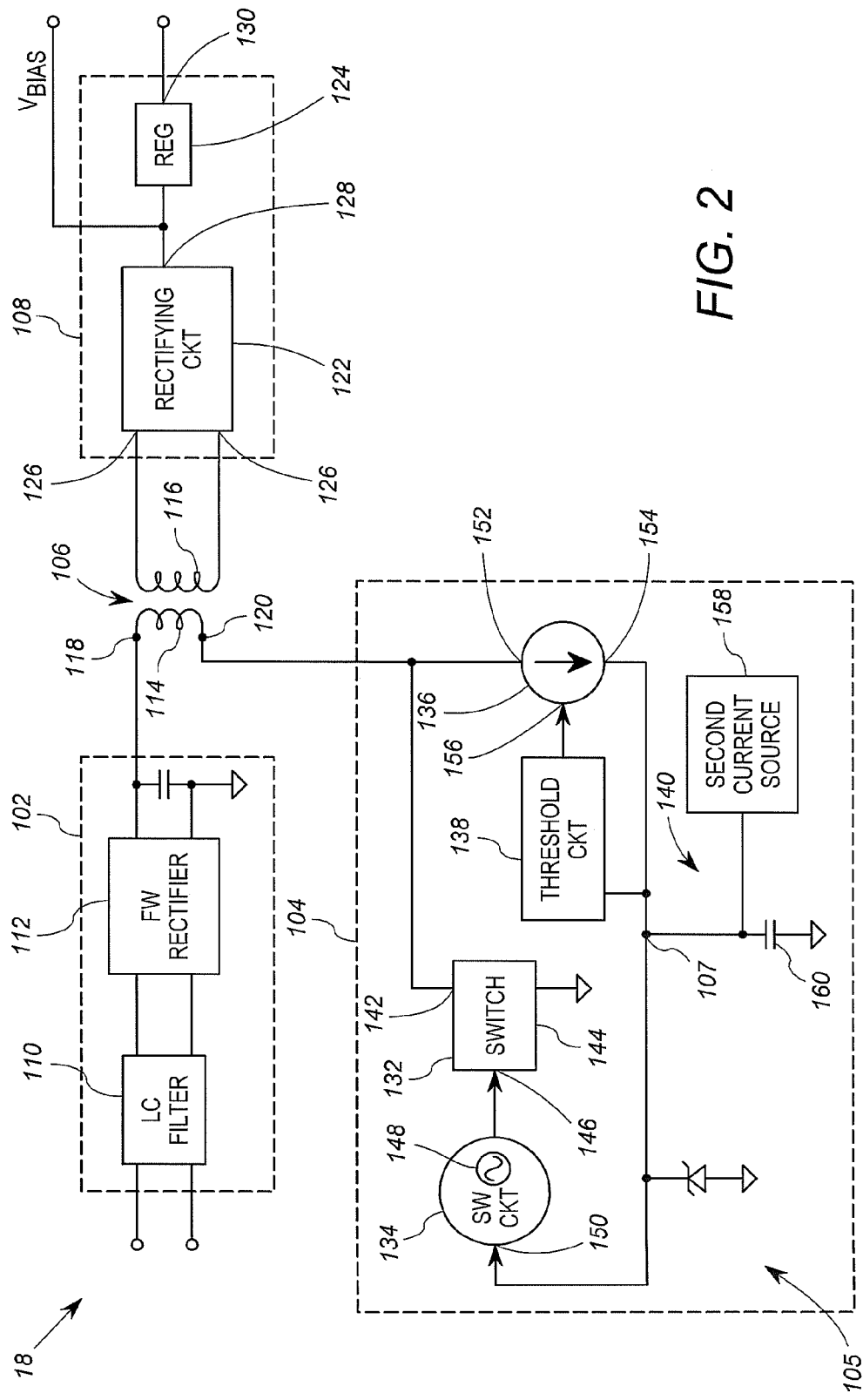
FIG. 2 shows a schematic block diagram of a switched mode power supply of the meter of FIG. 1.

FIG. 2 shows in further detail the power supply 18 of FIG. 1, which includes an input circuit 102, a frequency dithering switching circuit 104, a transformer 106, and an output circuit 108. The input circuit 102 includes an LC filter 110 and a full wave rectifier 112. The transformer 106 includes a primary winding 114 and a secondary winding 116. The primary winding 114 includes a first winding terminal 118 coupled to the full wave rectifier 112, and a second terminal 120 operably coupled to the switching circuit 104, as will be discussed further below in detail. As will be discussed below in detail, the transformer 106 may have additional windings in some embodiments.

Referring specifically to the input circuit 102, the LC filter 110 is a filter operably coupled to receive the 50 Hz or 60 Hz line signal, and configured to provide a line signal to the full wave rectifier 112. The LC filter 110 in this embodiment is a low pass filter configured to attenuate high frequency noise generated by switching circuit 104. The full wave rectifier 112 is configured to receive the filtered line signal from the LC filter 110 and provide a rectified AC signal, as is known in the art, to the first terminal 118 of the primary winding 114. The full wave rectifier 112 further provides the AC ground to which the switching circuit 104 is referenced. The full-wave rectifier 112 may suitably be a conventional diode bridge.

The output circuit 108 includes a rectifying circuit 122 and a voltage regulator 124. The rectifying circuit 122 has an input 126 coupled across the secondary winding 116, and an output 128 that forms one DC bias voltage source for the meter 10. Accordingly, the output 128 is thus coupled to one or more circuits within the meter 10 that use DC bias voltage, not shown in FIG. 2, but would be known to those of ordinary skill in the art. In the embodiment described herein, the rectifying circuit 122 includes a rectifier, such as a diode, not shown, and a smoothing capacitor, also not shown. The output 128 is further coupled to the voltage regulator circuit 124. The voltage regulator circuit 124 includes a regulated output 130 that is coupled to various devices within the meter 10, including the processing circuit 14 of FIG. 1, that operate using a regulated DC voltage. The voltage regulator circuit 124 may suitably be any conventional voltage regulator. Such devices are well known and the details of which have been omitted for clarity of exposition.

The switching circuit 104 includes a switching device 132, a switching signal circuit 134, a current source 136, a threshold circuit 138 and a bias circuit 140. In general, the switching circuit 104 is configured to cause a high frequency (>10 kHz) signal to be imposed on the rectified AC signal that propagates from the full-wave rectifier 112 through the primary winding 114. In general, the average pulse width of the high frequency signal is adjusted based on the load current pulled by the secondary 116. In accordance with the present invention, the switching circuit 104 is partially self-biased using the signal from the primary winding 114, and partially biased from the secondary current source 158, discussed further below. The switching signal circuit 134 is configured to generate a switching signal having a dithered frequency to spread the emitted EM energy over a range of frequencies.

In further detail of the switching circuit 104, the switching device 132 is a high power semiconductor switch having a first terminal 142, a second terminal 144, and a control terminal 146. The switching device 132 is configured conduct current between the first terminal 142 and the second terminal 144 when the control terminal 146 receives a turn-on voltage. The first terminal 142 is operably coupled to the second terminal 120 of the primary winding 114 of the transformer 106. The second terminal 144 of the switching device 134 is operably coupled to AC ground. The control terminal 146 is operably coupled to the switching signal circuit 134.

The switching signal circuit 134 includes an oscillator 148, not shown in FIG. 2, operably coupled to provide the turn-on voltage as a periodic signal to control terminal 146. The oscillator 148 has a bias signal input 150, and is configured to generate the periodic signal such that the periodic signal has a frequency that varies as a function of a bias voltage of a bias signal received at the bias signal input 150. The nominal frequency of the periodic signal is preferably greater than 10 kHz, and in one embodiment is 100 kHz. The frequency varies as much as 6% to 10% as a function of variance of the bias voltage.

The current source 136 is a switchable current source of conventional design, and includes an input terminal 152, an output terminal 154, and a control terminal 156. The input terminal 152 is coupled to the second terminal 120 of the primary winding 114 of the transformer 106. The output terminal 154 is operably coupled to the bias signal input 150 of the switching circuit 134. The current source 136 is configured to supply the current needs of the switching signal circuit 134 and the current needed to charge capacitor 160.

The threshold circuit 138 is coupled to controllably enable and disable the current source 136. The threshold circuit 138 is also operably coupled to receive the bias signal that is provided to the bias signal input 150. The threshold circuit 138 is configured to enable the current source 136 when the bias voltage falls below first threshold, and disable the current source 136 when the bias voltage exceeds a second threshold. The first and second thresholds are different, thereby defining upper and lower limits on when the current source 136 is turned on.

The bias circuit 140 includes a secondary current source 158 and a capacitor 160. The secondary current source 158 is operably coupled to the bias signal input 150. Similarly, the capacitor 160 is operably coupled to the bias signal input 150. The secondary current source 158 is configured to provide a first current that is less than an entire current of the bias signal. The capacitor 160 is similarly configured to provide a second current to the bias signal. As will be discussed below, the external current source 158 may suitably include an auxiliary winding of the transformer 106, but may be another source if desired. As will also be discussed below in detail, the capacitor 160 provides current to the bias signal and discharges during the off-cycles of the current source 136, which in turn provides the variation in the bias signal voltage at the bias signal input 150 to dither the switching frequency of the switching circuit 134.

In one embodiment, the switch 132, all or most of the switching signal circuit 134, the threshold circuit 138 and the current source 136 are disposed within an integrated circuit 105. The integrated circuit 105 has a bias input pin 107 which is essentially directly connected to the bias input 150 within the integrated circuit 105. The capacitor 160 and the secondary current source 158 are external to the integrated circuit 105 and are both coupled to the bias input pin 107.

In operation, the input circuit 102 receives an AC line signal (e.g. 50 Hz or 60 Hz), rectifies it and provides it to the primary winding 114 of the transformer 106. More specifically, the LC filter 110 receives the line signal and provides a line signal to the full wave rectifier 112. The full wave rectifier 112 receives the line signal from the LC filter 110 and provides a rectified AC signal, as is known in the art, to the first terminal 118 of the primary winding 114.

In general, the switching circuit 104 switches the rectified AC signal to generate a high frequency (>10 kHz) signal that propagates from the primary winding 114 to the secondary winding 116 of the transformer 106. The propagated high frequency signal on the secondary winding 116 has a voltage level defined by the turns ratio of the transformer 106, and in the instant embodiment may suitably be 10-24 volts. The rectifying circuit 122 rectifies the signal and provides smoothing to generate the DC bias voltage signal for the meter 10. The voltage regulator circuit 124 receives the DC bias voltage and generates a regulated DC bias signal, for example 3.3 to 5 volts DC.

The primary operation of the switching circuit 104 is alternately allow and prevent current from flowing through the primary winding 114 to create a high frequency component on the rectified AC line signal. The result is a high frequency (>10 kHz) pulse imposed upon the rectified line signal. Using any of a number of conventional techniques, the average pulse width is adjusted based on the load current pulled by the secondary 116.

To this end, the oscillator 148 in the switching signal circuit 134 generates at a high frequency signal having a nominal frequency. The switching signal circuit 134 generates the high frequency pulse signal based on the high frequency signal, both having the same frequency. Based on the bias signal voltage received at the bias signal input 150, the oscillator varies its output frequency, resulting in the varied frequency of the pulse signal. As will be discussed below, the bias signal voltage is varied between the first threshold and the second threshold of the threshold circuit 138. The bias signal voltage variance causes the oscillator 148 to sweep the frequency of the high frequency pulse signal from about 3% to 5% below the nominal frequency to 3% to 5% above the nominal frequency. Other sweep ranges may be employed in other embodiments.

The switching signal circuit 134 provides the resulting swept frequency (or dithered) pulse signal to the control input 146 of the switch 132. The switch 132 then either opens or closes the connection between the terminals 142, 144 based on the state of the pulse signal. The use of the terms "opens" and "closes" does not imply that the switch is necessarily electromechanical connection, but rather that current flow is substantially prevented, or allowed, respectively. In any event, the switch 132 operates at the dithered frequency of the pulse signal, and thereby generates EMI noise at a range of frequencies, as opposed to concentrating all of the noise energy at one frequency.

The switching signal circuit 134 further includes circuitry configured to provide current feedback, which provides a measure of load on the secondary winding 116. The switching signal circuit 134 uses the current feedback to adjust the pulse width of the pulse signal to accommodate the varying loads on the power supply 18, using any conventional method. It will be appreciated that other techniques may be used, including those that monitor voltage or current directly from the output circuit 108.

Figure 3:
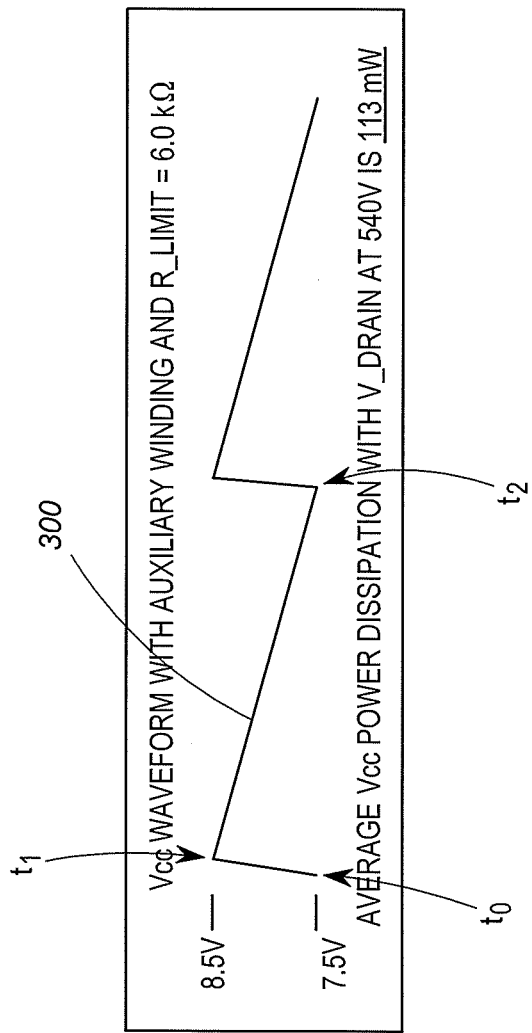
FIG. 3 shows a timing diagram of a bias signal voltage generated within the switched mode power supply of FIGS. 2.

As discussed above, the voltage of the bias signal varies. In this embodiment, the current source 136, the threshold circuit 138 and the bias circuit 140 cooperate to vary the bias voltage in a sawtooth or triangular wave form shown in FIG. 3. Referring to FIG. 3, a timing diagram of an exemplary of the bias signal 300 provided to the bias signal input 150 is shown. The bias signal 300 at $t_0$ is at the first threshold, rises sharply until $t_1$, at which time it reaches the second threshold. After $t_1$, the bias signal falls less sharply until it reaches the first threshold at the time $t_3$. The cycle thereafter repeats.

With reference to FIGS. 2 and 3, the bias signal 300 is created in the following manner. At $t_0$, the threshold circuit 138 turns on the current source 136 because the bias signal is at the first threshold. After $t_0$, the current source 136 provides a first portion of current to the bias signal input 150 and a second portion of current to charge capacitor 160. As the current source 136 provides current from the primary winding 114, the voltage of the bias signal rises as the current flows into capacitor 160. Thus, from $t_0$ to $t_1$, the voltage of the bias signal 300 rises, as shown in FIG. 3. At $t_1$, the voltage of the bias signal reaches the second threshold of the threshold circuit 138. As a consequence, the threshold circuit 138 turns off the current source 136. At after $t_1$, the capacitor 160 discharges to provide a first portion of the current to the bias signal input 150, while the secondary current source 158 provides a second portion of the current, preferably most of the current, to the bias signal input 150. As a result of the discharge of the capacitor 160 the voltage of the bias signal decreases. Thus, from $t_2$ to $t_3$, the bias voltage 300 declines, as shown in FIG. 3. At $t_3$, the voltage of the bias signal 300 declines to the first threshold. As a result, the threshold circuit 138 turns on the current source 136 and the process repeats.

A feature of the present embodiment is that not all of the bias power is derived from the primary winding 114. In particular, because the rectified line signal has a relatively high voltage (often exceeding 200 $V_{RMS}$), power consumption of the switching circuit 104 would be substantial if all of the current were supplied from the primary winding 114 via the current source 136. Thus, at least some of the current is provided by the other current source 158, which is configured to have a lower voltage and thus results in less overall power consumption. Moreover, because the current source 158 provides less than all of the required current, the capacitor 160 still goes through a charge/discharge circuit (according to the current source 136 operation) which provides the bias voltage dither.

It will be appreciated that in another embodiment, the connection between the winding 114 and the current source 136 can be eliminated altogether, and the secondary current source 158 can itself be controlled by the threshold circuit 138. The secondary current source 158 could still employ a voltage that is lower than the line voltage. However, the current source 158 would need to use a voltage that is high enough to cause the bias signal voltage to exceed the second threshold.

Nevertheless, the embodiment of FIG. 2 is particularly adapted to work with known integrated circuits that include most of the switching signal circuit 134, the switch 132, the threshold circuit 138 and the current source 136. Such integrated circuits include the off-line switch integrated circuit available from ON Semiconductors, such as the NCP101x family and NP105x family. In an alternative embodiment, the switch 132 is external to the integrated circuit, such in the ON Semiconductors integrated circuits NCP 1200 and the NCP1216. As discussed above, prior art use of these circuits includes deriving the bias signal completely from the transformer winding, and, alternatively, using only an externally generated bias signal that does not provide dithering.

Figure 4:
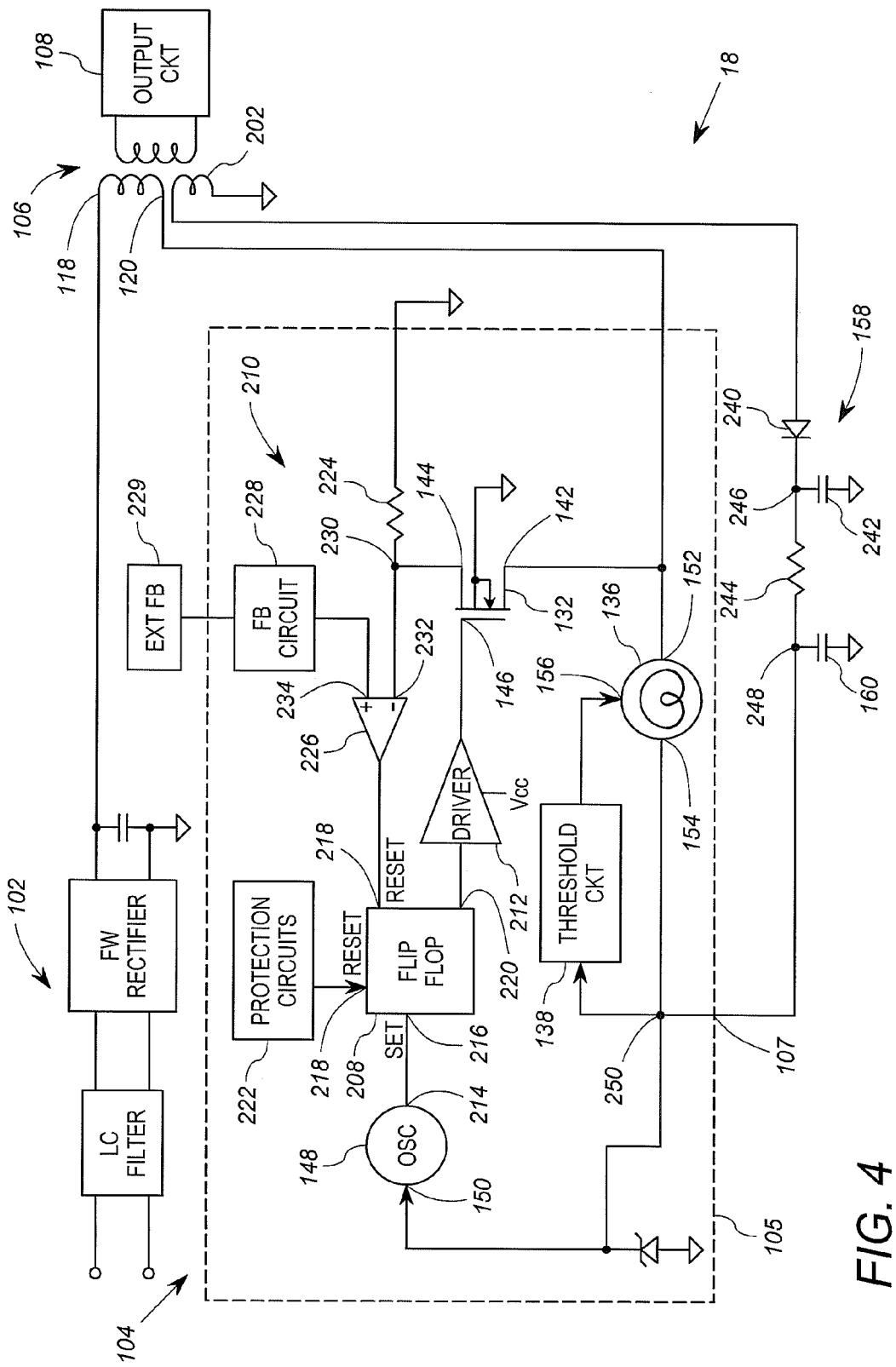
FIG. 4 shows a schematic block diagram of an exemplary detailed implementation of the switched mode power supply of FIG. 2.

FIG. 4 shows in further detail an exemplary implementation of the input circuit 102, the switching circuit 104, and transformer 106 of the power supply 18 that employs one of the off-line switch integrated circuits identified above. Like reference numbers will be used to identify like components of FIG. 2.

In the embodiment of FIG. 4, the transformer 106 includes an auxiliary winding 202 in addition to the primary winding 114 and the secondary winding 116. The auxiliary winding 202 includes a first winding terminal 204 and a second winding terminal 120 operably coupled to AC ground. The auxiliary winding 202 is operably coupled such that the primary winding 114 induces a current on the auxiliary winding 202. The primary winding 114 and auxiliary winding 202 have a turns ratio designed to generate a voltage of about 12 $V_{RMS}$ on the auxiliary winding 202.

In the embodiment of FIG. 4, the switching device 132 is a high power MOSFET. The first terminal 142 is the drain, the second terminal 144 is the source, and the control terminal 146 is the gate.

The switching signal circuit 134 of the embodiment of FIG. 4 includes the oscillator 148, a bistable switch 208, a current control circuit 210, and a driver 212. The oscillator 148 includes the bias voltage input 150, and has an output 214. The bistable switch 208 includes set input 216, at least one reset input 218, and an output 220. The bistable switch 208 is configured to provide a stable DC signal at the output 220 at a first level in a first state, and at a second level in a second state. The bistable switch 208 is configured to transition to the first state responsive to receiving a trigger signal at the set input 216, and to remain in the first state until receiving a trigger signal at the at least one reset input 218. The bistable switch 208 is configured to transition to the second state responsive to receiving the trigger signal at any of the at least one reset inputs 218, and remain in the second states until another trigger signal is received at the set input 216. In some embodiments, the bistable switch 208 may suitably be a flip-flop.

The set input 216 is coupled to the output 214 of the oscillator 148. One of the at least one reset inputs 218 is coupled to the current control circuit 210, as will be discussed below in further detail. Optionally, other reset inputs 218 may be coupled to protection circuits 222. The protection circuits 222 may be any of a plurality of circuits that detect conditions in which protection of the circuit requires that the switching device 132 be turned off. Such protection circuits can take multiple forms, such as, for example, those used for short circuit protection, and would be known to those of ordinary skill in the art. The output 220 of the bistable switch 208 is connected to the gate/control terminal 146 of the switching device via the driver 212. The driver 212 comprises an amplifier for driving the MOSFET switching device 132.

The current control circuit 210 includes a sense resistor 224, a comparator 226, and a feedback circuit 228. The sense resistor 224 is coupled between the source terminal 144 of the MOSFET switching device 132 and AC ground, and is configured to measure the drain-to-source current through the switch 132. A current sense node 230 defined between the sense resistor 224 and the source terminal 144 is operably coupled to a negative input 232 of the comparator 226. The feedback circuit 228 cooperates with external feedback elements 229 to form a conventional current control feedback circuit that monitors the voltage on the output circuit 108. The feedback circuit 228 is operably coupled to provide the feedback signal to a positive input 234 of the comparator 226. The output of the comparator 226 is operably coupled to one of the reset inputs 218 of the bistable switch 208.

In the embodiment of FIG. 4, the auxiliary current source 158 includes the auxiliary winding 202, a rectifier 240, a smoothing capacitor 242, and a current limiting resistor 244. The rectifier 240 is serially connected to between the first winding terminal 204 of the auxiliary winding 202 and a first terminal 246 the current limiting resistor 244. The second terminal 248 of the current limiting resistor 244 is coupled to a node 250, which is electrically directly connected to the bias signal input 150 via the bias input pin 107 of the integrated circuit 105. Thus, the node 250 defines the bias signal for the switching circuit 104. The smoothing capacitor 242 is coupled between the first terminal 246 of the current limiting resistor 244 and ground.

The auxiliary winding 202, the rectifier 240 and the smoothing capacitor 242 form a low voltage circuit configured to generate a DC voltage that exceeds the both thresholds of the threshold circuit 138 but which is substantially lower than the RMS voltage produce by the first winding 114. This ensures that much of the bias current is supplied by a lower voltage, and hence lower power source. In this exemplary implementation, the auxiliary winding 202, the rectifier 240, and the smoothing capacitor 242 of the low voltage circuit are selected to generate a DC voltage of about 12.2 V. The current limiting resistor 244 is chosen such that the maximum current provided through the resistor 244 is between 20% and 90%, and preferably over 50%, of the current needs of the switching circuit 104 (and any other element that employs the bias signal for power. In this exemplary implementation, the current limiting resistor 244 may have a resistance of approximately 6 kΩ in a system wherein the drain voltage (at terminal 142) is approximately 540 VAC.

In operation, the input circuit 102 receives an AC line signal (e.g. 50 Hz or 60 Hz), rectifies it and provides it to the primary winding 114 of the transformer 106 as a full wave rectified line signal. The line signal may suitably be from 120 VAC to 480 VAC. As discussed above in connection with FIG. 2, the switching circuit 104 switches the rectified AC signal to generate a high frequency (>10 kHz) signal that propagates from the primary winding 114 to the secondary winding 116 of the transformer 106. The propagated high frequency signal on the secondary winding 116 has a voltage level defined by the turns ratio of the transformer 106, and in the instant embodiment may suitably be 12-24 volts. In the embodiment of FIG. 4, the primary winding 114 also imposes a corresponding high frequency signal on the auxiliary winding 202.

As discussed above, the switching circuit 104 generally operates to alternately allow and prevent current from flowing through the primary winding 114 to create a high frequency component on the rectified AC line signal. The average pulse width is adjusted based on the load current pulled by the secondary 116.

To this end, the oscillator 148 in the switching signal circuit 134 generates at a high frequency signal having a nominal frequency. The oscillator 148 provides the signal to the set input 216 of the bistable switch 208. Each positive half-cycle of the high frequency signal reaches a logic signal level that causes the bistable switch 208 to be set, which causes the bistable switch 208 to generate a positive logic signal at the output 220. The bistable switch 216 provides the positive signal at the output 220 until the bistable switch 208 receives a logic high signal at one of its reset inputs 218. As will be discussed below, during normal operation, the current control circuit 210 provides a logic high "reset signal" at the reset input 218 every cycle of the high frequency signal. The per-cycle reset signal causes the bistable switch 208 to generate a low logic signal at its output 220 until the high frequency signal again provides a high logic level at the set input 216. As a result of the repetitive operation of the oscillator 148 and the current control circuit 210, the bistable switch 208 provides a high frequency pulse signal at its output 220. The current control circuit 210 varies the timing of the reset signal to vary the pulse width of the high frequency pulse signal.

As discussed above, the voltage of the bias signal received at the bias signal input 150, the oscillator 148 varies the frequency of the high frequency signal produced by the oscillator 148, which in turn varies the frequency of the high frequency pulse signal generated at the output 220 of the bistable switch 208. As also discussed above, the bias signal voltage is varied between the first threshold and the second threshold of the threshold circuit 138. As a result, the switching signal circuit 134 produces a swept frequency, high frequency pulse signal at the output 220 of the bistable switch 208.

The bistable switch 208 provides the high frequency pulse signal to the control input 146 of the switch 132 via the driver 212. The switch 134 then either conducts current, or does not conduct current, between the terminals 142, 144 based on the state of the high frequency pulse signal. Because of the frequency variation, the switch 132 operates at the dithered frequency of the high frequency pulse signal, and thereby spreads the spectrum of the EMI noise power over a range of frequencies, as opposed to concentrating all of the noise at one frequency.

As mentioned above, the current control circuit 210 varies the pulse width of the high frequency pulse (i.e. switching) signal based on the load on the power supply 18. The feedback circuit 228 generates a current threshold for generating the reset signal. In general, whenever the current through the winding 114 exceeds a threshold, the reset signal is suppressed. Whenever the current through the winding 114 falls below a threshold, then the reset signal is generated. To this end, the drop of the current over current sense resistor 224 generates a current sense voltage at the current sense node 230. When the current sense voltage at the node 230 exceeds the threshold of the feedback circuit 228, the comparator 226 generates a low logic output. When the current sense voltage at the node 230 falls below the threshold of the feedback circuit 228, the comparator 226 generates a high logic output, which constitutes the reset signal. The comparator 226 provides the reset signal from its output 236 to one of the reset inputs 218 of the bistable switch 208.

As discussed above, the voltage of the bias signal varies via the operation of the current source 136, the threshold circuit 138 and the bias circuit 140. FIG. 3, discussed further above, shows an exemplary bias signal 300 generated in this manner.

With additional reference to FIG. 3, the bias signal 300 is created in the following manner. At $t_0$, the threshold circuit 138 turns on the current source 136 because the bias signal is at the first threshold. After $t_0$, the current source 136 provides a first portion of the current to the bias signal input 150 and to charge capacitor 160, while the secondary current source 158 provides a second portion of the current, which is much smaller than the first portion, to the bias signal input 150 and to charge capacitor 160. Because the current source 136 provides current from the primary winding 114, the voltage of the bias signal at the node 250 rises as the current flows into capacitor 160. Thus, from $t_0$ to $t_1$, the voltage of the bias signal 300 rises, as shown in FIG. 3. At $t_1$, the voltage of the bias signal reaches the second threshold of the threshold circuit 138. As a consequence, the threshold circuit 138 turns off the current source 136. At after $t_1$, the capacitor 160 discharges to provide a first portion of the current to the bias signal input 150, while the secondary current source 158 provides a second portion of the current, preferably most of the current, to the bias signal input 150. The current limiting resistor 244 operates to prevent the secondary current source 158 from providing all of the current. As a result of the discharge of the capacitor 160 the voltage of the bias signal decreases. It will be appreciated that the voltage drop across the current limiting resistor 144 ensures that the current source 158 does not hold the voltage of the bias signal above the first threshold voltage. In the exemplary embodiment, the first threshold of the threshold circuit 138 is 7.5V and the second threshold of the threshold circuit 138 is 8.5 V.

In any event, as a result of the discharge of the capacitor 160 from $t_2$ to $t_3$, the bias voltage 300 declines, as shown in FIG. 3. At $t_3$, the voltage of the bias signal 300 declines to the first threshold. At that time, the threshold circuit 138 turns on the current source 136 and the process repeats.

The embodiment of FIG. 4 is especially useful when many of the components are implemented in an integrated circuit 105 that may be configured in a number of other ways for full flexibility. In the case of the ON Semiconductors discussed above, the oscillator 148, the bistable switch 208, the driver 212, the threshold circuit 138, the current source 136 and the internal feedback components 228 are all implemented in the integrated circuit 105. The switching device 132 may or may not be implemented within the integrated circuit 105. By eliminating the secondary current source 158, which is external to the integrated circuit 105, a fully self-biased switching circuit may be achieved using the same integrated circuit and the capacitor 160. Such an implementation may be advantageous if the input line voltage is lower. Thus, one feature of this embodiment is that it uses (and takes advantage of features of) off-the-shelf integrated circuits that can be used in other implementations of a switching power supply.

It will be appreciated that the above described elements are merely illustrative, and that those of ordinary skill in the art may readily devise their own implementations and modifications that incorporate the principles of the present invention and fall within the spirit and scope thereof.

What is claimed is:

1. A circuit for use in a switched mode power supply comprising:
    a switch;
    an integrated circuit including a switching signal generator operably coupled to the switch, the integrated circuit configured to jitter the frequency of the switch based on a voltage available at a bias voltage pin of the integrated circuit, the integrated circuit further comprising a current source coupled between a first terminal of the switch and a bias input pin, the current source configured to supply current for operation of the switching regulator when insufficient current is received through the bias input pin;
    a transformer comprising a primary winding, a secondary winding and an auxiliary winding, the primary winding operably coupled to receive a rectified line voltage, the primary winding further operably coupled to the first terminal of the switch;
    a capacitor coupled between the bias input pin and ground;
    a low voltage circuit operably coupled to the auxiliary winding, the low voltage circuit configured to provide voltage to the bias input pin;
    a current limiting resistor coupled between the low voltage circuit and the bias input pin, the current limiting resistor configured to limit current produced by the low voltage circuit to less than that required for operation of the integrated circuit.

2. The circuit of claim 1, wherein the secondary winding is operably coupled to provide voltage to at least one circuit of a utility meter.

3. The circuit of claim 1, wherein the integrated circuit includes a threshold circuit operably coupled to controllably enable and disable the current source based on the voltage level at the bias input pin.

4. The circuit of claim 3, wherein the integrated circuit generates a switching frequency based on a voltage level at the bias input pin.

5. The circuit of claim 1, wherein the integrated circuit includes the switch.

6. A frequency dithering switching circuit for a power supply, comprising:
    a switching device having a first terminal, a second terminal, and a control terminal, the switching device configured conduct current between the first terminal and the second terminal when the control terminal receives a turn-on voltage;
    a switching signal circuit including an oscillator operably coupled to provide the turn-on voltage as a periodic signal to control terminal, wherein the oscillator has a bias signal input, and is configured to generate a periodic signal having a first frequency that varies as a function of a bias voltage of a bias signal received at the bias signal input;
    a current source operably coupled between the first terminal and the bias signal input;
    a threshold circuit coupled to controllably enable and disable the current source, the threshold circuit operably coupled to receive the bias signal, the threshold circuit configured to enable the current source when the bias voltage falls below first threshold, and disable the current source when the bias voltage exceeds a second threshold; and
    a bias circuit including a secondary current source and a capacitor, wherein the external current source is configured to provide a first current that is less than an entire current of the bias signal, and wherein the capacitor provides a second current to the bias signal.

7. The frequency dithering switching circuit of claim 6, wherein the secondary current source further comprises:
    a winding of a transformer;
    a rectifier circuit coupled to the winding; and
    a current limiting resistor coupled to the bias signal input.

8. The frequency dithering switching circuit of claim 7, wherein the winding and the current limiting resistor are selected such that the secondary current source is configured to provide between 20% and 90% of the bias signal current.

9. The frequency dithering switching circuit of claim 6, wherein the current source is operably coupled to charge the capacitor when enabled, such that the capacitor charges when the current source is enabled, and discharges when the current source is disabled.

10. The frequency dithering switching circuit of claim 6, wherein the switching device is a power MOSFET, the first terminal is a drain of the power MOSFET, the second terminal is source of the power MOSFET, and the control terminal is a gate of the power MOSFET.

11. The frequency dithering switching circuit of claim 6, wherein the switching signal circuit further comprises a bistable switch, the bistable switch having a set input and a first reset input, wherein the oscillator has an oscillator output operably coupled to the set input.

12. The frequency dithering switching circuit of claim 11, wherein the switching signal circuit further includes a current control circuit operably coupled to the reset input of the flip flop.

13. The frequency dithering switching circuit of claim 12, wherein the current control circuit includes a comparator having a first input coupled to a sense resistor and a second input connected to a feedback circuit.

14. A method for use in a switching power supply, comprising:
   using an integrated circuit to provide a switching signal to a switching device having a first terminal, a second terminal, and a control terminal, the switching device configured to conduct current between the first terminal and the second terminal when the control terminal receives a turn-on voltage;
   varying a switching frequency as a function of a bias voltage of a bias signal, the bias signal providing current for operation of the integrated circuit;
   controllably enabling a current source when the bias voltage falls below first threshold, and disabling the current source when the bias voltage exceeds a second threshold, the current source operably coupled between the first terminal and a bias signal input of the integrated circuit;
   providing from a source external to the integrated circuit a first current that is less than an entire current of the bias signal,
   providing from a capacitor a second current to the bias signal when the current source is disabled.

15. The method of claim 14, wherein the capacitor is external to the integrated circuit.

16. The method of claim 15, further comprising charging the capacitor when the current source is enabled.

17. The method of claim 16, further comprises using the current source to charge the capacitor.

18. The method of claim 14, further comprising:
   rectifying an AC line signal to produce a rectified AC line signal;
   using the switching device to switch the rectified AC line signal to produce a switched, rectified AC line signal;
   providing the switched, rectified line signal to the current source.

19. The method of claim 14, wherein varying the switching frequency comprises varying the switching frequency 6% to 10%.

* * * * *